INVENTOR
PAUL S. DICKEY
BY
Raymond D. Junkins
ATTORNEY

Sept. 5, 1939. P. S. DICKEY 2,172,317
FEED CONTROL METHOD AND SYSTEM FOR MILLS
Filed June 30, 1936 2 Sheets-Sheet 2

Inventor
PAUL S. DICKEY
By Raymond D. Junkins
Attorney

Patented Sept. 5, 1939

2,172,317

UNITED STATES PATENT OFFICE 2,172,317

FEED CONTROL METHOD AND SYSTEM FOR MILLS

Paul S. Dickey, Cleveland, Ohio, assignor to Bailey Meter Company, a corporation of Delaware Application June 30, 1936, Serial No. 88,172

7 Claims. (Cl. 83—44)

This invention relates to control systems and more particularly to control systems for regulating the output of pulverizing mills.

One object of my invention is to provide a means for maintaining the desired amount of material in the pulverizer regardless of changes in the rate of output.

A further object is to provide means for varying the quantity of material in a pulverizer in accordance with the rate of output.

Still another object is to provide means for quickly varying the output of a pulverizer in accordance with changes in the demand for the pulverized material.

It is a further object to provide a control system for an air-swept pulverizer wherein the rate of feed of material is regulated in accordance with the power input to the pulverizer and the rate of air flow therethrough.

Further objects will be apparent from the following description and from the drawings in which.

I have chosen to illustrate and describe my invention with reference to fuel pulverizers for providing an element of combustion for a steam generating furnace or furnaces, although it will be apparent from a study of the invention and to those skilled in the art that the invention may be equally applicable to pulverizers of lime, paint pigment, or other materials, which for various reasons must be ground or pulverized to a finely divided state and desirably transported by means of air to a point of usage or of storage.

Figures 1, 2:
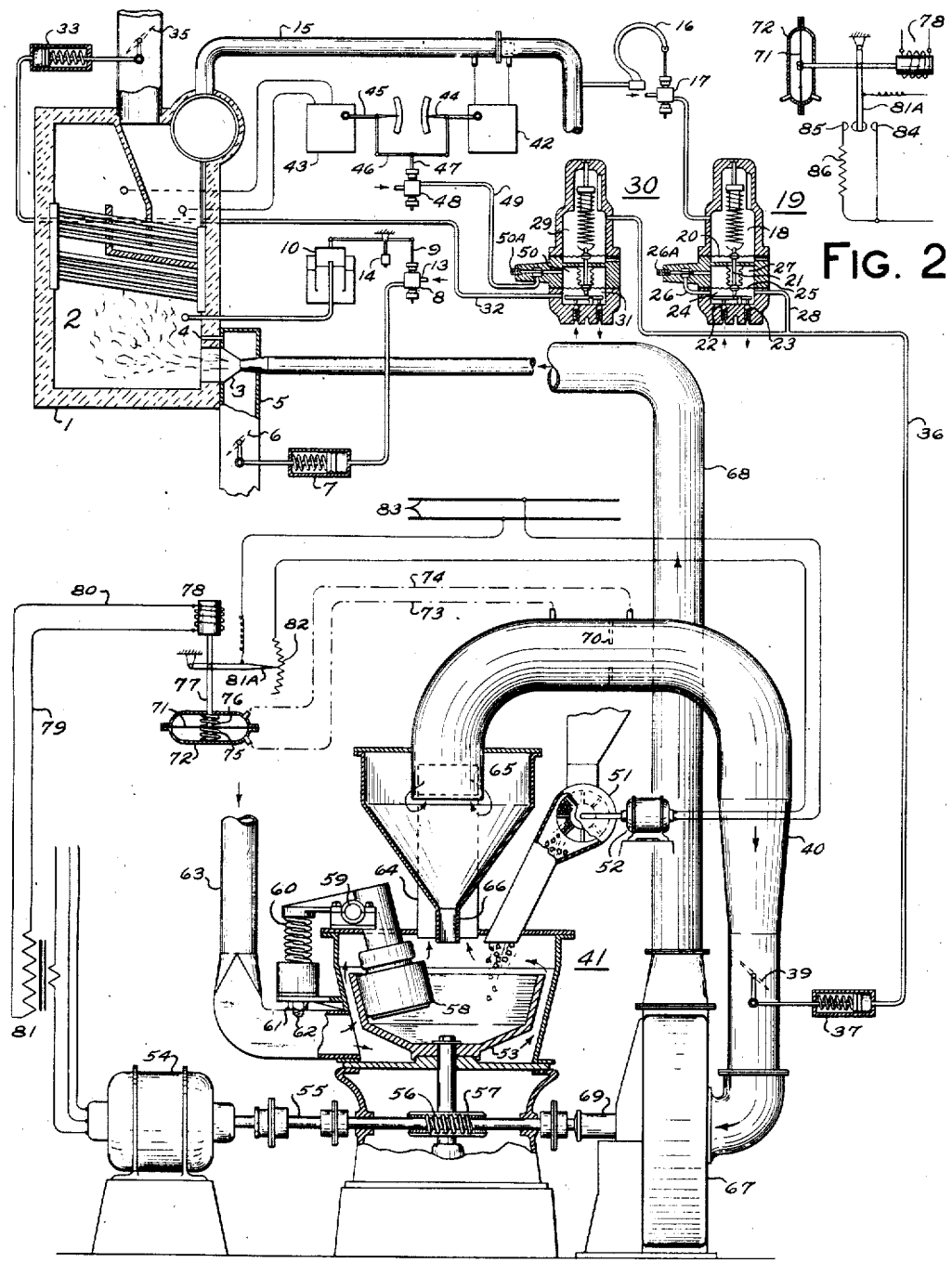
Fig. 1 is an illustrative embodiment of my invention.
Fig. 2 illustrates a modified form of a part of the apparatus shown in Fig. 1.

Referring to Fig. 1, I have represented generally at I a vapor generator having a combustion chamber 2 to which fuel and primary air is supplied through a burner 3; and secondary air through ports 4 leading to an air duct 5. The draft within the furnace 2 may be controlled by regulating the rate of secondary air flow. To this end I show a damper 6 positioned by a servo-motor, generally indicated at 7, sensitive to fluid pressures established by a pilot valve 8 having a movable valve member 9 positioned by a liquid sealed bell 10 responsive to changes in draft within the furnace 2.

Figure 3:
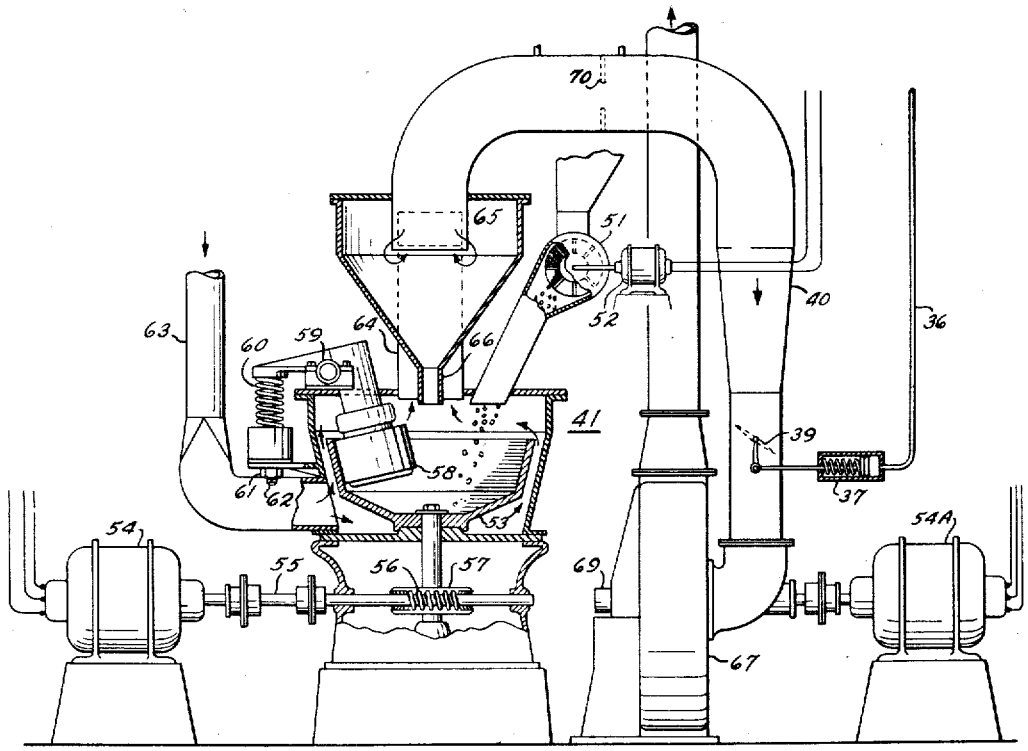
Fig. 3 is similar to Fig. 1 with some modification.

The pilot valve generally indicated at 8 may be, for example, as the type shown in Fig. 3 of Patent No. 2,054,464 to Clarence Johnson. A suitable fluid, such as air, is admitted to an inlet port 13 from any convenient source (not shown) and establishes within the servo-motor 7 a loading pressure proportional to the position assumed by the movable valve member 9. In the illustration of Fig. 1, the liquid sealed bell 10 is counterbalanced by a pendulum 14, so that for every draft existing within the furnace 2 there will be a definite position of the movable valve member 9 and accordingly a definite loading pressure impressed upon the servo-motor 7 resulting in a corresponding definite position of the damper 6 regardless, therefore, of variations in the rate of air flow through the furnace 2, the draft therein will be maintained within a predetermined definite range of values.

The pilot valve 8 has an axially located passageway open at either end to the atmosphere and to which the inlet port 13 and the outlet connection to the servo-motor 7 connects. The movable valve member 9 located in the passageway has two lands, the lower one of which is located substantially adjacent the outlet connection and the upper one of which is located above the inlet connection. Air under pressure, admitted through the inlet port flows through the passageway and is discharged from either end thereof to the atmosphere. In passing the lands a pressure gradient is established, that is the air is reduced in pressure from that which exists at the inlet port to that of the atmosphere. Accordingly, the pressure effective in the outlet connection will be varied as the position of the lower land is changed relative thereto. As the movable member is moved downwardly the pressure at the outlet connection will increase. In some instances, as explained with reference to pilot valve 48, I may desire the outlet pressure to decrease upon downward movement of the movable valve member, in which case I make the outlet connection adjacent the upper land.

As shown, upon an increase in furnace draft, for example, the liquid sealed bell 10 will be positioned downwardly a proportionate amount, raising the valve member 9 and decreasing the loading pressure effective within the servo-motor 7, which will then act to position the damper 6 in an opening direction, tending to restore the draft within the furnace 2 to the desired valve.

Vapor liberated in the generator I is transmitted through a conduit 15 to a point of usage (not shown). In order that the rate of fuel and air supplied the generator 1 may be maintained in proportion to the demand for vapor, I show connected to the conduit 15 a pressure sensitive Bourdon tube 16 arranged to position a pilot valve 17. The pilot valve 17 is arranged to establish a loading pressure varying inversely with changes in vapor pressure within the conduit 15. The loading pressure established by the pilot valve 17 is transmitted to a chamber 18 of a standardizing relay 19.

The standardizing relay 19 is of the type forming the subject matter of Patent No. 2,098,914 to Harvard H. Gorrie, wherein loading pressures within the chamber 18 act upon a diaphragm 20 to operate through the agency of a movable member 21, supply and waste valves 22 and 23 respectively. Valves 22 and 23 control the admission and discharge of pressure fluid to and from a chamber 24. Pressures within the chamber 24 act upon a diaphragm 25 to exert a force on the movable member 21 in opposition to the force exerted thereon by the fluid pressures established within the chamber 18. The arrangement so far described is such that upon an increase in fluid pressure within the chamber 18 the admission valve 22 will open and permit fluid pressure to be admitted to the chamber 24 until the increase in fluid pressure therein is proportional to that within the chamber 18, when the inlet valve 22 will close. Conversely, upon a decrease of fluid pressure within the chamber 18 the waste or discharge valve 23 will open to discharge pressure from the chamber 24 until the pressure therein is again in proportion to that existing within the chamber 18.

Connected to the chamber 24 by a passageway 26 is a chamber 27. Pressures established within the chamber 27 act upon the diaphragm 25 in opposition to those established within the chamber 24. The passageway 26 is provided with an adjustable resistance 26A, so that the rate at which pressure changes within the chamber 27 will follow those established in the chamber 24 may be varied as desired.

In operation, upon a change in vapor pressure within the conduit 15 from that desired, a proportionate change in fluid pressure will occur within the chamber 18 causing an immediate proportionate change within the chamber 24. Thereafter pressure fluid will pass through the passageway 26 to or from the chamber 27 and effect a continuing change in fluid pressure within the chamber 24 in the same sense as the original change and at a rate proportional to the magnitude of the original change. Such regenerative action will continue until the pressure within the conduit 15 is restored to the desired value. It is apparent, therefore, that the relay 19 acts to give an immediate fluid pressure change proportional to the change in vapor pressure, and thereafter a continuing change in fluid pressure until the vapor pressure is restored to the desired value.

Fluid pressures established within the chamber 24 are transmitted through a pipe 28 to a chamber 29 of a relay 30, somewhat similar to the standardizing relay 19. Changes in fluid pressure within the chamber 29 effect proportionate changes in fluid pressure within a chamber 31, which is connected by a pipe 32 to a servo-motor 33 operating a damper 35 controlling the rate of flow of the products of combustion through the vapor generator 1.

Fluid pressures established within the chamber 24 are also transmitted through the pipe 28 and a pipe 36 to a servo-motor 37 operating a valve or damper means 39 located in an outlet duct 40 of a pulverizer generally indicated at 41 to control the rate of flow of primary air and fuel to the burner 3 as hereinafter more fully described.

The arrangement is such that upon a decrease in vapor pressure within the conduit 15, for example, the fluid pressure within the chamber 18 will increase a proportionate amount, causing an immediate proportionate change in the fluid pressure established within the chamber 24 and transmitted to the servo-motors 33 and 37, which will act to position the dampers 35 and 39 proportionately in an opening direction. Thereafter through the regenerative action of the standardizing relay 19 the fluid pressure within the chamber 24 will continuously increase at a relatively slow rate and cause a further continuing increase in the rate of air and fuel supply until the pressure of the vapor within the conduit 15 is restored to the desired value. Upon an increase in vapor pressure within the conduit 15 the converse action will occur, an immediate and proportionate decrease in the rate of air and fuel supply being effected and thereafter a continuing decrease being effected until the vapor pressure is again restored to the desired value.

As known, for optimum combustion efficiency a predetermined relation should be maintained between the rate of air flow through the generator 1 and the rate of vapor flow therefrom. In the control system illustrated, to accomplish this end the damper 35 is continuously readjusted to maintain the optimum relation between the rate of air flow and the rate of vapor flow. Therein I show diagrammatically a meter 42 of the rate of vapor flow from the generator 1, and a meter 43 of the rate of air flow through the generator 1. The meter 42 may be provided with an indicator 44 to exhibit the rate of vapor flow through the conduit 15, and similarly the meter 43 may be provided with an indicator 45 to exhibit the rate of air flow through the generator 1. The arrangement is such that upon an increase in the rate of vapor flow the indicator 44 moves upwardly, whereas upon an increase in the rate of air flow the indicator 45 moves downwardly. The arrangement I have shown is diagrammatic and, as well known in the art, such a relation gage may be arranged so that the indicators 44 and 45 move over a common chart, or relative to a common index, so that departure from the desired ratio between rate of vapor flow and rate of air flow is indicated by a departure of the indicators from coincidence. Such a relation gage is described in Patent 1,257,965 to Bailey, to which reference may be had for a more complete description.

Pivotally connected to the indicators 44 and 45 is a differential link 46 to the midpoint of which is connected a movable valve member 47 of a pilot valve 48. So long as the desired relation exists between the rate of vapor flow and the rate of air flow, the valve member 47 will remain stationary. When, however, there is a deviation from the desired relation, the valve member 47 will be positioned upwardly, or downwardly, a proportionate amount and effect a corresponding change in the loading pressure transmitted through a pipe 49 to a chamber 50 of the relay 30. Pressures established within the chamber 50 modify the pressures established within the chamber 31 and transmitted to the servo-motor 33. Thus upon an increase in the rate of vapor flow the valve member 47 will be positioned upwardly, increasing the fluid pressure effective within the chamber 50 and causing a proportionate increase in fluid pressure within the chamber 31 and transmitted to the servo-motor 33 effecting an opening of the damper 35, thereby restoring the desired relation between the rate of air flow and the rate of vapor flow.

In order that changes in the rate of air flow effected through the agency of the standardizing relay 19 may take precedence over those effected by the pilot valve 48, the pipe 49 is connected to the chamber 50 through a throttling valve 50A, so that changes in loading pressure within the pipe 49 act gradually and permit the consummation of changes in fluid pressure within the chamber 29 before becoming materially effective within the chamber 50.

In a control system such as I have described it is imperative, if the vapor pressure is to be maintained at substantially the desired value at all times, that upon a change in vapor pressure from the desired value an immediate change be made in the rate of fuel feed to the generator. Heretofore trouble has been experienced in effecting an immediate change in the rate of fuel feed in response to a change in vapor pressure, particularly in systems where pulverized fuel is transported directly to the combustion chamber by a stream of carrier air from a pulverizer. A feature of my invention resides in the method and means I have provided for effecting immediate changes in the rate of fuel flow to the boiler in response to changes in the demand.

In Fig. 1 I show my control system applied to the pulverizer 41 to which fuel to be pulverized is fed by a feeder 51 driven by a motor 52. Fuel from the feeder 51 drops to the interior of a bowl 53 continuously rotated at constant speed by a motor 54 operatively connected thereto through a shaft 55, worm 56, and worm wheel 57. Fuel within the bowl 53 is thrown against the lateral side thereof by centrifugal action, where it is pulverized by one or more rollers, such as indicated at 58, suitably arranged about the circumference of the bowl. The roller 58 is supported by a trunnion 59 and urged outwardly against the interior lateral wall of the bowl by a compression spring 60, the tension of which is adjustable by a nut 61 threaded to a rod 62.

The finely divided or pulverized fuel is picked up by a stream of carrier air, transmitted to the interior of the pulverizer by a duct 63, and transported through one or more suitable passageways, such as indicated at 64, to a classifier 65 where the coarse particles of fuel are returned to the bowl for further pulverization through a passage 66. The finely pulverized fuel and the steam of carrier air is then drawn through the duct 40 by an exhauster fan 67 and forced through a duct 68 to the burner 3. The exhauster fan 67 is preferably driven by the motor 54 through an extension 69 of the shaft 55.

Since in Fig. 1 I have shown the bowl 53 and exhauster fan 67 driven by a constant speed motor 54 it will be apparent that if desirable I may employ a second motor to drive the exhauster fan without departing from the teachings of my invention as will be understood by those skilled in the art. Where in the claims and specification I speak of "power input to the pulverizer" it should be understood that I mean the power consumed by the motor driving the pulverizer elements regardless of whether such motor does or does not drive auxiliary apparatus associated with the pulverizer. Thus by way of example in Fig. 3 I show the motor 54 coupled solely to the pulverizer 41 and used only to drive the pulverizer elements comprising the bowl 53 and rollers 58. The exhauster fan 67 is driven by a constant speed motor 54A.

Positioned in the duct 40 is an orifice 70 which establishes a differential pressure bearing a functional relation to the rate of flow of carrier air through the pulverizer. Sensitive to the differential pressure is a diaphragm 71 located within a suitable casing 72. The pressure existing on the upstream, or high pressure side, of the orifice 70 is transmitted through a pipe 73 to one side of the diaphragm 71, whereas the pressure existing on the downstream, or low pressure side of the orifice 70 is transmitted through a pipe 74 to the opposite side. Movements of the diaphragm 71 effected by variations in the differential pressure established across the orifice 70 are opposed by springs 75 and 76, so that for every value of the differential pressure there is a definite position of the diaphragm 71.

Connected to the diaphragm 71 is a movable member 77 carrying at its opposite end the movable core of a solenoid 78, which is electrically connected through conductors 79 and 80 to the secondary of a current transformer 81, the primary of which is connected in circuit with the motor 54.

It is apparent that the diaphragm 71 will exert a force upon the member 77 proportional to the rate of flow of carrier air through the mill 41, whereas the solenoid 78 will exert a force acting in opposition thereto proportional to the power input to the motor 54 and accordingly to the pulverizer 41. If the force exerted by the diaphragm 71 predominates over that exerted by the solenoid 78, the member 77 will be positioned upwardly as viewed in the drawings a proportionate amount whereas if the force exerted by the solenoid 78 predominates the member 77 will be positioned downwardly a proportionate amount.

Secured to the member 77 is a pivoted contact arm 81A engaging a resistance 82 connected in circuit with the feeder motor 52, and a suitable source therefor 83. When the differential pressure established by the orifice 70 increases, the contact arm 81A will be positioned upwardly, decreasing the amount of resistance 82 in circuit with the motor 52 and increasing the speed of the feeder 51. Conversely, upon an increase of the power input to the motor 54 the member 77 will be positioned downwardly, increasing the resistance in circuit with the feeder motor 52 and decreasing the speed of the feeder 51.

Figure 4:
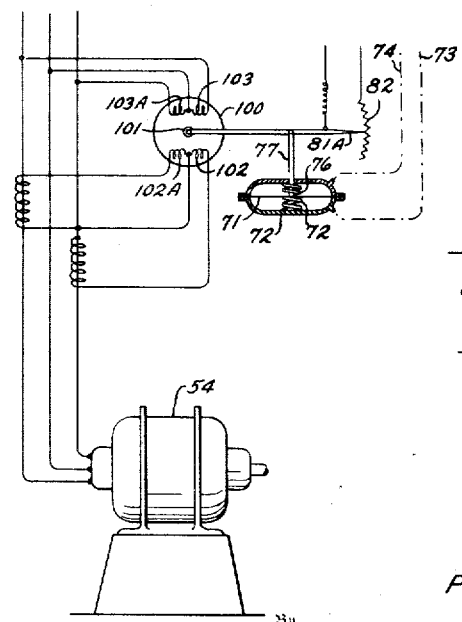
Fig. 4 is a somewhat diagrammatic representation of a part of Fig. 3.

Under some circumstance the current supplied the motor 54 may not be a sufficiently accurate measure of the power consumed thereby, and in such cases I may prefer to use the modification shown in Fig. 4. Therein I show an electrical instrument similar to a polyphase watt meter and comprising a disc 100 angularly movable about a shaft 101 and pivotally connected to the member 77. Stationary current coils 102—102A and potential coils 103—103A act to produce a turning force on the disc 100 proportional to the power consumed by the motor 54. As shown, the current coils 102—102A may be coupled to the power lines through suitable transformers, or in other cases it may be preferable to connect them directly thereto. The means I have shown for determining the current or power consumption of the motor 54 should be taken as merely illustrative and forming no part of my present invention. As will be understood by those familiar with the art, the particular current or power measuring means employed may be modified as may be found necessary in any particular case.

A direct functional relation exists between the quantity of material in the pulverizer 41 and the rate of pulverization. Likewise a direct functional relation exists between the power input to the motor 54 and the rate of pulverization. Accordingly the power input to the motor 54 as determined through the agency of the current transformer 81 is directly proportional to the quantity of material in the pulverizer 41 and the rate of pulverization therein. The rate of flow of carrier air through the pulverizer 41 likewise influences the output of the pulverizer, so that a change in carrier air will immediately effect a change in pulverizer output directly proportional thereto.

In operation, the rate of flow of carrier air through the mill 41 and the rate of pulverized fuel flow to the generator 1 is controlled by the damper 39 in accordance with changes in vapor pressure within the conduit 15 as hereinbefore described. A change in carrier air flow effected by a positioning of the damper 39, for example, an increase in carrier air flow, immediately increases the differential across the orifice 70, thereby increasing the speed of the motor 52 and the rate of fuel flow to the pulverizer 41. The resistance 82 is so arranged that the increase in fuel feed so obtained is greater than that necessary to supply the increased output of the mill demanded by the increase in the rate of flow of carrier air. Accordingly the quantity of fuel within the mill will rapidly increase, likewise rapidly increasing the rate of pulverization. As the rate of pulverization increases the power input to the motor 54 will increase, and when it has changed an amount directly proportional to the increase in flow of carrier air the contact arm 81A will be positioned to decrease the rate of fuel feed to the pulverizer. Thereafter the feeder 51 will be operated to maintain the quantity of material in the mill, or inferentially the rate of pulverization, so that the power input to the mill will be maintained in predetermined ratio to the rate of flow of carrier air through the mill.

In Fig. 2 I show a modification wherein the springs 75 and 76 for opposing movements of the diaphragm 71 are omitted. In this modification the fluid pressures on opposite sides of the orifice 70 are transmitted through pipes 73 and 74 to opposite sides of the diaphragm 71 as in Fig. 1. Upon an unbalance between the force produced by the diaphragm 71 and that produced by the solenoid 78, the contact arm 81A is positioned to engage either a contact 84 or 85. Engagement of the contact arm 81A with the contact 84 indicates that the differential established by the orifice 70 has increased and serves to connect the motor 52 directly across the source 83 so that it is operated at maximum speed. Engagement of the contact 81A with the contact 85 indicates that the power input to the pulverizer has increased beyond that desired for the then existing rate of carrier air flow, and serves to energize the motor 52 through a resistance 86 so that it is operated at a predetermined minimum speed until the desired relationship is again established.

Figure 6:
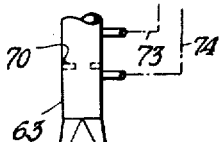
Figs. 5 and 6 illustrate modified forms of apparatus for determining the rate of flow of carrier air through a pulverizer.
Figure 5:
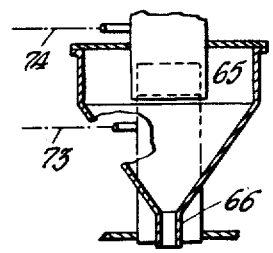

While I have described a particular embodiment of my invention, it is obvious that various modifications and rearrangements of parts may be made without departing from the spirit and scope of the invention. For example, the orifice 70 is illustrative of but one particular means for determining the rate of flow of carrier air through the pulverizer and I might, if desired, obtain an indication of the rate of air flow as shown in Fig. 5 by utilizing the differential existing across the classifier 65, which as known bears a functional relation to the rate of air flow through the pulverizer, or I might as shown in Fig. 6 locate the orifice 70 in the duct 63 leading to the mill 41. Accordingly reference should be had to the appended claims rather than to the description to determine the scope of the invention.

What I claim as new, and desire to secure by Letters Patent of the United States, is:

1. The method of changing the output of an air-swept pulverizer which includes, changing the rate of air flow through the pulverizer in amount proportional to the change in output desired, changing the rate of feed of material to the pulverizer in excess of the desired change in output and maintaining said excessive rate of feed until the power input to the pulverizer attains a predetermined value.

2. The method of changing the output of an air-swept pulverizer which includes, changing the rate of air flow through the pulverizer in amount proportional to the change in output desired, determining the power input to the pulverizer, changing the rate of feed of material to the pulverizer in excess of the desired change in output and maintaining said excessive rate of feed until the power input to the pulverizer changes an amount corresponding to the change in air flow through the pulverizer.

3. The method of producing a desired change in the output of an air-swept pulverizer which includes producing an initial and relatively rapid change in the rate of air flow through the pulverizer, thereafter producing a continuous and relatively slow change in the air flow until the desired change is consummated and simultaneously controlling the rate of material fed to the pulverizer in accordance with the direct ratio between the power input to the pulverizer and the instantaneous rate of air flow through the pulverizer.

4. In a control system for producing a desired change in the output of an air swept pulverizer, comprising in combination, a pulverizer, means for initially varying the rate of air flow through the pulverizer in proportion to the change in output desired and for thereafter continuously varying the rate of air flow until the desired change in output is consummated, means responsive to the power input to the pulverizer, means responsive to the rate of air flow through the pulverizer, and means conjointly responsive to said last two named means for controlling the rate of fuel fed to the pulverizer.

5. The method of increasing the output of an air swept pulverizer a predetermined amount which includes, increasing the rate of air flow through the pulverizer an amount proportional to the change in output desired, increasing the rate of feed of material to the puverizer an amount in excess of the change desired, determining the power input to the pulverizer, and maintaining the increased rate of feed until the power input to the pulverizer changes an amount proportional to the change in rate of air flow through the pulverizer.

6. In combination, a pulverizer, means for passing a current of air through said pulverizer to pick up fine particles of material, means for measuring the rate of air flow through the pulverizer, means for measuring the power input to the pulverizer, means for determining the difference between said measurements, and means directly actuated by said last named means for varying the rate of feed of material to the pulverizer.

7. In combination with an air swept pulverizer, means for varying the rate of feed of material to the pulverizer, means for measuring the air flow through the pulverizer, means for measuring the power input to the pulverizer, and means directly under the joint control of said last two named means for regulating the rate of feed of material to the pulverizer.

PAUL S. DICKEY.

CERTIFICATE OF CORRECTION.

Patent No. 2,172,317.                                September 5, 1939.

PAUL S. DICKEY.

It is hereby certified that error appears in the printed specification of the above numbered patent requiring correction as follows: Page 3, first column, line 61, for "steam" read stream; and second column, line 59, for "circumstance" read circumstances; page 4, second column, line 50, beginning with the words "In a control" strike out all to and including the word and period "pulverizer." in line 62, and insert instead the following as claim 4—

In combination, a pulverizer, means for passing a current of air through said pulverizer to pick up fine particles of material, means for producing a differential pressure bearing a functional relation to the rate of air flow through said pulverizer, a diaphragm sensitive to said differential for producing a proportional force, a motor for driving said pulverizer, electromagnetic means sensitive to the current input to said motor for producing a force proportional thereto, a member positioned in accordance with the difference in said forces, means for feeding material to said pulverizer, and means under the control of said member for varying the rate of operation of said last named means. ;

line 68, claim 5, for "puverizer" read pulverizer; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.

ing a current of air through said pulverizer to pick up fine particles of material, means for measuring the rate of air flow through the pulverizer, means for measuring the power input to the pulverizer, means for determining the difference between said measurements, and means directly actuated by said last named means for varying the rate of feed of material to the pulverizer.

7. In combination with an air swept pulverizer, means for varying the rate of feed of material to the pulverizer, means for measuring the air flow through the pulverizer, means for measuring the power input to the pulverizer, and means directly under the joint control of said last two named means for regulating the rate of feed of material to the pulverizer.

PAUL S. DICKEY.

CERTIFICATE OF CORRECTION.

Patent No. 2,172,317. September 5, 1939.

PAUL S. DICKEY.

It is hereby certified that error appears in the printed specification of the above numbered patent requiring correction as follows: Page 3, first column, line 61, for "steam" read stream; and second column, line 59, for "circumstance" read circumstances; page 4, second column, line 50, beginning with the words "In a control" strike out all to and including the word and period "pulverizer." in line 62, and insert instead the following as claim 4—

In combination, a pulverizer, means for passing a current of air through said pulverizer to pick up fine particles of material, means for producing a differential pressure bearing a functional relation to the rate of air flow through said pulverizer, a diaphragm sensitive to said differential for producing a proportional force, a motor for driving said pulverizer, electromagnetic means sensitive to the current input to said motor for producing a force proportional thereto, a member positioned in accordance with the difference in said forces, means for feeding material to said pulverizer, and means under the control of said member for varying the rate of operation of said last named means. ;

line 68, claim 5, for "puverizer" read pulverizer; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.